Dec. 19, 1961    R. HENDERSON    3,013,794
SHOCK NEUTRALIZER FOR ROAD VEHICLES
Filed March 29, 1960
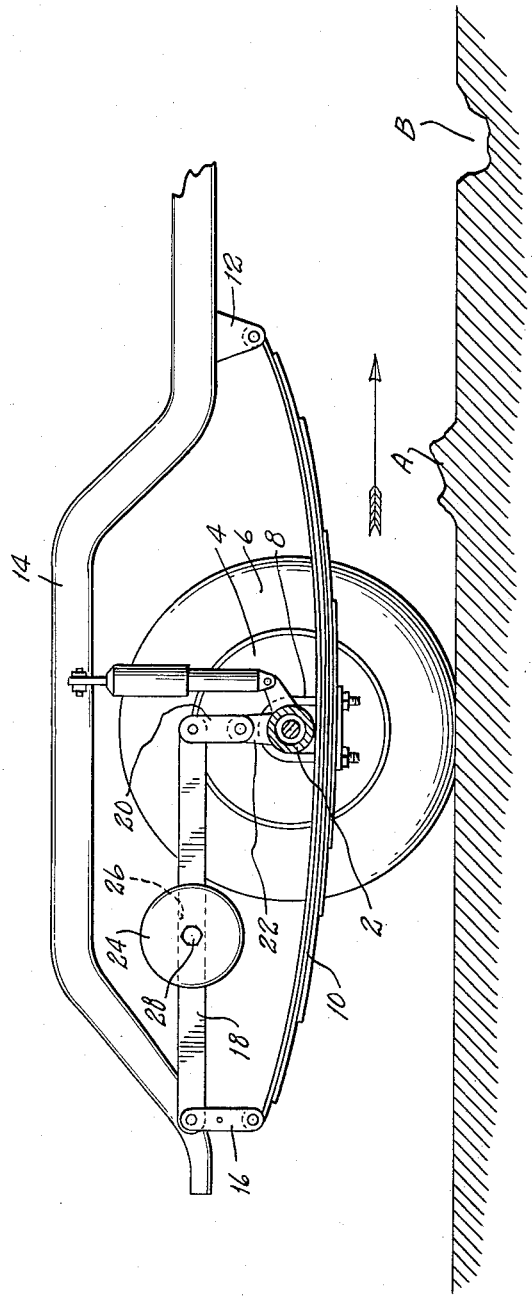
INVENTOR:
Robert Henderson : 3,013,794
Patented Dec. 19, 1961

3,013,794
SHOCK NEUTRALIZER FOR ROAD VEHICLES
Robert Henderson, 40 Mohawk Road, Short Hills, N.J.
Filed Mar. 29, 1960, Ser. No. 18,441
8 Claims. (Cl. 267—8)

This invention relates to improved means for neutralizing shocks communicated to road vehicles from road irregularities.

The indicated object is accomplished according to this invention by the pivotal connection of opposite ends of an approximately horizontal, rigid, rocker bar to a wheel axle and to the body of a road vehicle with a weight fixed at an intermediate point upon said bar. The arrangement is such that, with said weight acting as an inertia member, vertical movements momentarily set up at the end of the bar pivoted to the wheel axle will tend strongly to cause momentary, opposed vertical movements in the opposite end of the bar, which is pivoted to the vehicle body, and thereby oppose communication of road shock from the wheel to the vehicle body.

Although different types of body suspensions are employed in various vehicles and often are different as between the front and back wheels of a given vehicle, this invention operates upon a similar principle in all vehicles.

The accompanying drawing is a diagrammatic, side elevational view, illustrating this invention as employed in association with a wheel, on which a vehicle chassis (fragmentarily shown) is supported by means of a semi-elliptic spring.

Suitable spring mountings are provided, of course, on all wheels of the vehicle and this invention is similarly applicable in principle to all wheels of the vehicle. As illustrated, an axle housing 2, carrying a wheel 4, fitted with a pneumatic tire 6, is rigidly clamped by U bolts 8 (only one being shown) to an intermediate point of a semi-elliptic spring 10, one end of which is pivoted to a lug 12 rigidly fixed to one point on a chassis side member 14 and the other end of which is pivoted through a shackle 16 to another separated point on said chassis side member.

In accordance with this invention, a substantially horizontal, rigid rocker bar 18 is pivoted at its one end to the chassis member 14 at the point on the latter to which the shackle 16 is pivoted; and the bar 18 is pivoted at its other end through a shackle 20 to a lug 22 which is rigidly fixed to or rigidly integral with said axle housing 2, preferably quite close to the wheel 4.

A weight member 24 is either formed integrally with or fixed rigidly upon rocker bar 18 at an intermediate point on the latter. If this weight member is fixed upon the rocker bar, it may be formed with an internal bore or passage 26 through which the bar 18 may extend with an accurate sliding fit; and a headed set-screw 28 may be threaded into one side of the weight member with its inner end jammed tightly against the bar 18 to hold the weight member against shifting relatively to said bar.

In use on a vehicle, this invention operates, during movement of the vehicle along a road, substantially to neutralize road shocks resulting from the wheel striking either a protruding or a recessive road irregularity. It should aid, in understanding this invention, to note that a spring and pneumatic tire provided in association with a vehicle wheel are not free or unflexed when they carry their part of the weight of the vehicle but are very substantially stressed; the total stress forces in the spring and tire being in reactive equilibrium with the part of the weight of the vehicle supported by the wheel. This accounts for the recognized fact that, despite the use of greatly improved springs and cushion pneumatic tires which absorb a large measure of road shock, a small but nevertheless very objectionable residue of the road shock finds its way to the vehicle's chassis to the discomfort of passengers in the vehicle. The present invention very substantially neutralizes this residue; utilizing mechanical principles now to be explained.

Referring to things as they are shown in the drawing, let it be assumed that the vehicle is moving toward the right as indicated by the arrow and that the tire 6 strikes the protuberance A in the road. The tire and the spring 10 absorb much but not all of the resulting shock; the wheel 4 and the axle housing 2 are momentarily thrown upwardly and, in the absence of this invention, this upward thrust or shock would be communicated as an upward thrust or shock to the chassis member 14, hence, to the entire vehicle. With the present invention, however, the mentioned momentary upward thrust is effective upwardly, through shackle 20, upon the right or front end of the rigid bar 18. In the presence of this momentary upward thrust at the front end of the bar, the weight member 24, by reason of its inertia, resist moving upwardly with the bar 18 and, consequently, acts as a fulcrum for said bar so that the latter strongly tends to turn slightly in a counterclockwise direction around said weight. As a result, the left or rear end of the bar 18 momentarily exerts a strong downwardly directed force at the rear end of the chassis member 14 which substantially counteracts the upward force momentarily directed toward the chassis through and at both ends of the spring. As an ultimate result, the wheel is momentarily thrown upwardly and the spring momentarily flexes upwardly, but the chassis member 14 and the vehicle thereon remain substantially undisturbed.

Let it now be assumed that, in further rightward movement of the vehicle, the tire 6 encounters and momentarily drops into the recess B in the road. Here again, the weight member 24, by reason of its inertia, resists displacement, this time downwardly, and acts as a fulcrum for bar 18 to cause the latter to turn clockwise so that its back end momentarily supports the chassis member 14 and the related vehicle body during the momentary period during which the spring has eased up its support of the chassis and the vehicle body.

Immediately after passing either of the two mentioned types of road irregularities, the various mentioned parts return to their normal conditions as before encountering the road irregularity.

It may seem that as loaded road vehicles are quite heavy, a weight member of inordinate size would be required. That would not be true, however, for several reasons, (1) that each wheel (each equipped with this invention) supports only a fraction, usually one-fourth, of the entire load, (2) the shock to be neutralized by this invention is only the small portion of disturbance or shock that cannot be absorbed by the tire and spring, and (3) as the shock is only instantaneous or momentary, the inertia of relatively little weight will suffice for the indicated purpose and operation. Moreover, the weight member may be of lead or other heavy metal.

The preferred weight of the weight member and the preferred position thereof on the bar 18 may probably be determined by suitable calculation, but, in any event, these factors may be determined by relatively simple tests.

The present invention is not designed to counteract vibrations that commonly occur after the encountering of a road shock, but, by strongly opposing the road shocks themselves, this invention greatly minimizes or obviates such vibrations. Such vibration of the tire, wheel and spring as may persist may be snubbed or absorbed by any conventional so-called "shock-absorber," one form of which is shown at 30, pivotally connected at its opposite ends between the axle housing 2 and the chassis member 14 in a well-understood manner.

A rocker bar and weight member assembly, as described (hereinafter referred to for convenience as an "inertia assembly"), may, if desired and under some conditions and with suitable variations in the weight of the weight member, be provided, where two wheels are carried at opposite ends of an axle housing, to extend from a point on the axle housing which is midway between said two wheels to a central point at the back end of the vehicle's chassis. In such an arrangement, a single inertia assembly will serve for the two wheels. However, where the several wheels of a vehicle are independently suspended, separate inertia assemblies should be provided for each wheel as first suggested and described herein. This invention, obviously, may be provided for all wheels of a vehicle; and if some adaptation is necessary to do so, the adaptation may easily be effected by a skilled artisan.

A bar such as, for example, bar 18 is sometimes referred to herein as being "horizontal." Such a reference is not intended to be interpreted in an absolute sense but is intended to refer to a bar which is disposed with its effective ends sufficiently out of vertical alignment that forces tending to rotate the bar about an intermediate point thereof will give rise to movements at opposite ends of the bar which have a substantial vertical component. Such a rocker bar may extend either longitudinally of the vehicle as illustrated in the drawing or transversely of the vehicle; or it may extend obliquely between said longitudinal or transverse positions.

As this inventive concept may be utilized in various ways other than as illustrated and described herein, the scope of this invention should not be limited except to the extent indicated in the following claims.

I claim:
1. A shock neutralizer for road vehicles comprising a rocker bar, the opposite ends of which are pivotally connected, at points more nearly in horizontal alignment than in vertical alignment, to the vehicle body and an axle housing which carries a wheel of the vehicle and upon which housing the body of the vehicle is yieldably supported, and a weight on said rocker bar; the center of gravity of said weight being between and in approximate alignment with both of the bar's said connection points.

2. A shock neutralizing device for road vehicles which have plural wheels upon axles of which a load-carrying body is yieldably supported, said device comprising an approximately horizontal bar pivotally connected at its opposite ends to the axle of one of said wheels and to the load-carrying body, said bar having its weight substantially concentrated at an intermediate point thereof in approximate alignment with the bar's opposite ends.

3. A device according to claim 1, said weight being adjustably shiftable longitudinally of said bar, and the device including means for selectively fixing said weight rigidly to said bar at different intermediate points thereon.

4. A shock neutralizing device for road vehicles which have plural wheels upon axles of which a load-carrying body is yieldably supported, said device comprising an approximately horizontal bar pivotally connected at its opposite ends to the axle of one of said wheels and to the load-carrying body, said bar having a mass of material of substantial weight at an intermediate point thereof and in approximate alignment with the bar's opposite ends, the said mass of material having sufficient inertia to substantially oppose vertical displacement thereof upon momentary imposition of road shock in a vertical direction upon the end of said bar which is pivoted to the wheel axle.

5. A device according to claim 2, said concentration of weight being localized approximately centrally between vertical lines coincident with the effective ends of said bar.

6. Supporting means for the body of a vehicle, comprising a road wheel, an axle upon which said wheel is carried, yieldable means between said axle and the vehicle for supporting the latter yieldably, a horizontal bar pivotally connected at its opposite ends to said axle and said body and a weight member integral with and intermediately located upon said bar in approximate alignment with both of the bar's said opposite ends.

7. Means according to claim 6, further including a snubbing device, connected between said axle and said body.

8. A shock neutralizer for road vehicles, comprising a rocker unit which includes a rocker bar having its weight substantially concentrated at an intermediate point thereof in substantial alignment with the bar's ends, the opposite ends of said bar being pivotally connected, at points more nearly in horizontal alignment than in vertical alignment, to the vehicle body and to an axle which carries a wheel of the vehicle and upon which axle the body of the vehicle is yieldably supported.

References Cited in the file of this patent

UNITED STATES PATENTS

| 989,958 | Frahm | Apr. 18, 1911 |
| 2,199,084 | Schieferstein | Apr. 30, 1940 |
| 2,483,185 | Crabtree | Sept. 27, 1949 |
| 2,833,552 | Polhemus | May 6, 1958 |
| 2,865,651 | Chayne et al. | Dec. 23, 1958 |

FOREIGN PATENTS

| 813,471 | France | Feb. 22, 1937 |